(12) United States Patent
Elgimiabi

(10) Patent No.: US 11,667,807 B2
(45) Date of Patent: Jun. 6, 2023

(54) THERMAL CYCLING RESISTANT LOW DENSITY COMPOSITION

(71) Applicant: 3M INNOVATIVE PROPERTIES COMPANY, St. Paul, MN (US)

(72) Inventor: Sohaib Elgimiabi, Dusseldorf (DE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 153 days.

(21) Appl. No.: 16/763,102

(22) PCT Filed: Nov. 19, 2018

(86) PCT No.: PCT/IB2018/059093
§ 371 (c)(1),
(2) Date: May 11, 2020

(87) PCT Pub. No.: WO2019/102335
PCT Pub. Date: May 31, 2019

(65) Prior Publication Data
US 2020/0347260 A1  Nov. 5, 2020

(30) Foreign Application Priority Data

Nov. 22, 2017 (EP) .................................... 17203079

(51) Int. Cl.
| | | |
|---|---|---|
| C09D 163/00 | (2006.01) | |
| B05D 3/12 | (2006.01) | |
| B05D 7/16 | (2006.01) | |
| C08G 59/24 | (2006.01) | |
| C08G 59/50 | (2006.01) | |
| C08K 3/40 | (2006.01) | |
| C08K 5/00 | (2006.01) | |
| C08K 5/05 | (2006.01) | |
| C08K 5/5313 | (2006.01) | |
| C08K 5/5333 | (2006.01) | |
| C08K 7/20 | (2006.01) | |

(52) U.S. Cl.
CPC ............ *C09D 163/00* (2013.01); *B05D 3/12* (2013.01); *B05D 7/16* (2013.01); *C08G 59/245* (2013.01); *C08G 59/5033* (2013.01); *B05D 2202/10* (2013.01); *B05D 2202/25* (2013.01); *B05D 2203/30* (2013.01); *B05D 2504/00* (2013.01); *C08K 3/40* (2013.01); *C08K 5/0066* (2013.01); *C08K 5/05* (2013.01); *C08K 5/5313* (2013.01); *C08K 5/5333* (2013.01); *C08K 7/20* (2013.01)

(58) Field of Classification Search
None
See application file for complete search history.

(56) References Cited

U.S. PATENT DOCUMENTS

| | | | | |
|---|---|---|---|---|
| 2002/0187292 | A1* | 12/2002 | Singler | C23C 4/02 428/36.91 |
| 2006/0144555 | A1* | 7/2006 | Suzuki | B22C 9/043 164/516 |
| 2008/0093021 | A1* | 4/2008 | Merz | C08G 18/10 156/330 |
| 2016/0017172 | A1* | 1/2016 | Thorlaksen | B05D 3/0406 428/414 |
| 2016/0229965 | A1* | 8/2016 | Chmielewski | C09J 7/25 |
| 2018/0141310 | A1* | 5/2018 | Coumans | C23C 8/36 |
| 2019/0048127 | A1* | 2/2019 | Kasemi | C09D 163/00 |

FOREIGN PATENT DOCUMENTS

| | | |
|---|---|---|
| EP | 0838499 | 4/1998 |
| EP | 1674518 | 6/2006 |
| EP | 2495271 | 9/2012 |
| EP | 2818490 | 12/2014 |
| WO | WO 2004/024792 A1 | 12/2005 |
| WO | WO 2005/118162 A1 | 12/2005 |
| WO | WO 2013-159279 | 10/2013 |
| WO | WO 2014-067095 | 5/2014 |

OTHER PUBLICATIONS

Kaur, "Eco-Friendly Cardanol-Based Phenalkamine Cured Epoxy-Cenosphere Syntactic Foams: Fabrication and Characterization," Journal of Applied Polymer Science, Dec. 2016, vol. 133, No. 46, pp.
Khatalewar, "Effect of Molecular Weight of Phenalkamines on the Curing, Mechanical, Thermal and Anticorrosive Properties of Epoxy Based Coatings," Progress in Organic Coatings, Jul. 2015, vol. 84, pp. 79-88.
Kim, "New Highly Chemical Resistant Epoxy Curing Agents," Journal of Surface Coatings Australia, 2014, vol. 51, No. 1, pp. 12-15.
Panda, "Effect of Alkyl Phenol from Cashew Nutshell Liquid on Mechanical and Dry Sliding Wear Behavior of Epoxy Resin," Bio Resources, 2015, vol. 10 No. 3, pp. 4126-4136.
International Search Report for PCT International Application No. PCT/IB2018/059093, dated Mar. 1, 2019, 5 pages.

\* cited by examiner

*Primary Examiner* — Megan McCulley
(74) *Attorney, Agent, or Firm* — 3M Innovative Properties Company; Carlos M. Téllez Rodriguez

(57) ABSTRACT

A curable coating composition precursor comprising: (a) a first part (A) comprising (i) at least one amine epoxy curing agent based on a phenolic lipid, and (ii) inorganic microspheres; and (b) a second part (B) comprising (i) at least one epoxy resin, (ii) optionally, at least one reactive diluent, (iii) at least one epoxy reactive flexibilizer, and (iv) inorganic microspheres. The curable coating composition precursor comprises at least one fire retardant compound in part (A) and/or part (B), and the curable coating composition obtained by combining part (A) and part (B) has a density of less than 0.7 g/cm$^3$.

16 Claims, No Drawings

US 11,667,807 B2

THERMAL CYCLING RESISTANT LOW DENSITY COMPOSITION

CROSS REFERENCE TO RELATED APPLICATIONS

This application is a national stage filing under 35 U.S.C. 371 of PCT/IB2018/059093, filed Nov. 19, 2018, which claims the benefit of EP Application No. 17203079.3, filed Nov. 22, 2017, the disclosures of which are incorporated by reference in their entireties herein.

TECHNICAL FIELD

The disclosure relates to curable two-part epoxy coating compositions. Further, the present disclosure further relates to a method for smoothening surfaces. Moreover, the present disclosure further relates to a use of the coating compositions in manufacture and maintenance operations, in particular in aerospace industries.

BACKGROUND

Abradable coatings and fillers find widespread use in manufacturing and maintenance processes. That is, a composition is spread over a surface which may contain defects, cracks or gaps, or used to fill a gap in a surface. Then, after the composition has cured, the coating may be sanded or polished so as to obtain an even or smoothed surface.

For example, this may be useful in filling gaps between panels, repairing cracks in surfaces, or generally smoothing surfaces.

While abradable coatings and processes as described are known in the art, progresses in certain industries have considerably raised the bar for already demanding requirements for abradable coatings. One of the most demanding environment for adrabable coating compositions is the aerospace industry. Here, the coating must exhibit a combination of properties such as resistance to higher temperatures and humidity over prolonged periods of time, low weight and good abradability. Moreover, even fire retardant properties may be required for most applications in aerospace, but also other industrial applications such as observed in the automotive or transportation manufacture industries. Apart from that, it is desirable that the abradable compositions are also suitable for automated application.

For these reasons, there exists desire from industry for new materials and processes for smoothening surfaces and/or filling gaps, which exhibit a combination of properties suited for demanding environments and applications.

SUMMARY

In one aspect, the present disclosure provides a curable coating composition precursor, comprising: (a) a first part (A) comprising (i) at least one amine epoxy curing agent based on an phenolic lipid, and (ii) inorganic microspheres; and (b) a second part (B) comprising (i) at least one epoxy resin, (ii) optionally, at least one reactive diluent, (iii) at least one epoxy reactive flexibilizer, and (iv) inorganic microspheres. The curable coating composition precursor comprises at least one fire retardant compound in part (A) and/or part (B); and the curable coating composition obtained by combining part (A) and part (B) has a density of less than 0.7 g/cm$^3$ In another aspect, the present disclosure further provides a method of smoothening surfaces comprising the following steps: (a) Providing a curable coating composition precursor as described herein, (b) Combining parts (A) and (B) of the curable coating composition precursor so as to form a curable coating composition; (c) Applying the curable coating composition to at least part of the surface a substrate; (d) Allowing the curable coating composition to cure so as to obtain a cured coating; and (e) Sanding the surface comprising the cured coating, thereby obtaining a smoothed surface.

Furthermore, the present disclosure relates to the use of the curable coating composition precursor according to the present disclosure for manufacture and maintenance operations in aerospace and automotive industries.

DETAILED DESCRIPTION

Before any embodiments of this disclosure are explained in detail, it is to be understood that the disclosure is not limited in its application to the details of construction and the arrangement of components set forth in the following description. The invention is capable of other embodiments and of being practiced or of being carried out in various ways. As used herein, the term "a", "an", and "the" are used interchangeably and mean one or more; and "and/or" is used to indicate one or both stated cases may occur, for example A and/or B includes, (A and B) and (A or B). Also herein, recitation of ranges by endpoints includes all numbers subsumed within that range (e.g., 1 to 10 includes 1.4, 1.9, 2.33, 5.75, 9.98, etc.). Also herein, recitation of "at least one" includes all numbers of one and greater (e.g., at least 2, at least 4, at least 6, at least 8, at least 10, at least 25, at least 50, at least 100, etc.). Also, it is to be understood that the phraseology and terminology used herein is for the purpose of description and should not be regarded as limiting. Contrary to the use of "consisting", which is meant to be limiting, the use of "including," "containing", "comprising," or "having" and variations thereof is meant to be not limiting and to encompass the items listed thereafter as well as additional items.

Amounts of ingredients of a composition may be indicated by % by weight (or "% wt". or "wt.-%") unless specified otherwise. The amounts of all ingredients gives 100% wt unless specified otherwise. If the amounts of ingredients is identified by % mole the amount of all ingredients gives 100% mole unless specified otherwise.

In the context of the present disclosure, the terms "room temperature" and "ambient temperature" are used interchangeably and refer to a temperature of 23° C. (±2° C.) at ambient pressure condition of about 101 kPa.

Unless explicitly stated otherwise, all embodiments and optional features of the present disclosure can be combined freely.

The first aspect of the present disclosure is A curable coating composition precursor, comprising
  (a) a first part (A) comprising:
    (i) at least one amine epoxy curing agent based on an phenolic lipid;
    (ii) inorganic microspheres;
  (b) a second part (B) comprising:
    (i) at least one epoxy resin;
    (ii) optionally, at least one reactive diluent;
    (iii) at least one epoxy reactive flexibilizer;
    (iv) inorganic microspheres;
  wherein
  the curable coating composition precursor comprises at least one fire retardant compound in part (A) and/or part (B); and the curable coating composition obtained by combining part (A) and part (B) has a density less than 0.7 g/cm³

Curable coating composition precursors as the one according to the present disclosure are also known as 2-component compositions or 2k-compositions. It is understood that the first part (A) is physically separated from the second part (B) of the curable coating composition precursor. The first part (A) and second part (B) are mixed before the intended use according to the user's needs so as to obtain a curable composition. The present disclosure also covers a curable composition, obtained from the curable coating composition precursor and a cured composition obtained from curing the curable composition. The use of these 2k-compositions offers several advantages such as a longer shelf-life, the possibility to form a curable composition according to the user's needs, and a readily curable composition which itself offers further handling advantages for the user, in particular in the technical field of industrial manufacture of parts of aircrafts or other vehicles for transportation of goods and persons.

Due to the combination of ingredients of the curable coating composition precursor according to the present invention, the composition and its precursor exhibit combination of desirable properties such as good handling properties, low density which is particularly advantageous for light weight assemblies, resistance towards higher temperatures and humidity even for prolonged period of time, easy abradability and fire retardant properties advantageous for aerospace applications, good mechanical strength while at the same time exhibiting excellent sandability. That is, the curable coating composition precursor may be stored for a period of time, handled with ease in maintenance or manufacture facilities, may be applied easily, may be easily sandable to a favourable outer appearance, and my provide protection against weathering influences even at higher temperatures. Furthermore, the combination of ingredients of the curable composition precursor according to the present disclosure gives rise to the advantage that the curable compositions may be cured at ambient temperatures, i.e. without the need of additional heating. This is particularly advantageous for applications where large substrates are being coated. At least one or even the combination of properties makes the curable coating composition precursor according to the present disclosure excellently suited for manufacture or maintenance operations in aerospace and automotive industries.

Epoxy curing agents suitable for use in the present disclosure are compounds which are capable of cross-linking (curing) the epoxy resin. Suitable curing agents according to the present invention may be primary or secondary amines. Part (A) of the curable coating composition precursor as described herein comprises at least one amine epoxy curing agent based on a phenolic lipid.

Without wishing to be bound by theory, it is believed that amine curing agent based on a phenolic lipid provides good resistance towards higher temperatures and humidity of the cured coating without sacrificing the ability to the curable compositions as described herein being cured at ambient temperature. The use of the amine epoxy curing agent based on a phenolic lipid has the advantage of an improved resistance of the cured coating obtained from the curable coating composition towards weathering and water. In other words, the coating obtained from the compositions according to the present disclosure may exhibit good resistance to water and weathering. This has the advantage that the compositions as described herein offer a corrosion resistance when applied on metal surfaces such as steel surfaces and a general protection against water and weathering of parts coated with the compositions as described herein.

Generally, the term "phenolic lipids" is used for a class of natural products composed of long aliphatic chains and phenolic rings. As used herein, this term describes compounds of either natural or preferably synthetic origin composed of long aliphatic chains and phenolic rings. The presence of the at least one phenolic lipid in the curable casting resin and its precursor may have the effect of improved flexibility of the resin compositions even at low temperatures and increased hydrophobicity also of the cured resin obtained therefrom. Preferably, the at least one phenolic lipid is selected from alkylcatechols, alkylphenols, alkylresorcinols and anacardic acids. More preferably, the at least one phenolic lipid is an alkylphenol selected from propylphenol, butylphenol, amylphenol, octylphenol, nonylphenol, dodecylphenol and cardanol-based compounds. An amine epoxy curing agent as described herein may be obtained from the phenolic lipid by means of a Mannich reaction with aldehydes (such as formaldehyde) and polyamines with phenolic lipids which introduces aminoalkyl groups to the phenolic ring. Preferably, the amine epoxy curing agent based on a phenolic lipid is a phenalkamine. Phenalkamines useful for the compositions as described herein are commercially available from, for example, Huntsman Corp. under the trade designation Cardolite, such as Cardolite NX5607 and the like.

Preferably, part (A) of the curable coating composition precursor according to the present disclosure comprises the at least one amine epoxy curing agent based on a phenolic lipid in an amount of from 15 to 80 wt.-%, preferably from 25 to 75 wt.-%, more preferably from 30 to 70 wt.-%, based on the total weight of part (A). Using a lower amount of this epoxy curing agent will not result in coatings having the desired weather resistance and longer curing times, while using higher amounts would result in unsuitable mechanical and curing properties.

Preferably, part (A) of the coating compositions as described herein may further comprise at least one second amine epoxy curing agent. This may have the effect of improved mechanical strength of the cured coatings such as shear strengths on composites and/or Shore D hardness. It is preferred that the at least one second amine epoxy curing agent is selected from polymeric amines, polymeric diamines, polymeric polyamines and epoxy-amine adducts, preferably polyamidoamines. Preferably, part (A) comprises the at least one second amine epoxy curing agent in an amount of from 10 to 60 wt.-%, preferably from 15 to 55 wt.-%, more preferably from 20 to 50 wt.-%, based on the total weight of part (A). When present, it is preferred that the at least one first amine epoxy curing agent and the at least one second epoxy curing agent are present in about the same amounts. That is, the combined amounts of the at least one first and the at least one second amine epoxy curing agents may be in the range of from of from 15 to 80 wt.-%, preferably from 25 to 75 wt.-%, more preferably from 30 to 70 wt.-%, based on the total weight of part (A).

For example, the at least one second amine epoxy curing agent for use herein may comprise the general structure:

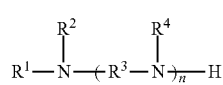

Formula (1)

wherein the residues $R^1$, $R^2$, and $R^4$, independently from each other, may represent hydrogen or a hydrocarbon (such as an alkyl) or an alkoxy or a polyoxyalkyl residue containing about 1 to 15 carbon atoms;

$R^3$ represents a polyether alkyl residue, preferably containing about 1 to 15 carbon atoms;

n represents any integer from 1 to 10.

The residues $R^1$, $R^2$, and $R^4$ are chosen such that the amine contains two primary amine groups. Exemplary polyether amines suitable for use herein are commercially available under the trade designation JEFFAMINE from Huntsman Chemicals, or TTD (4,7,10-trioxatridecane-1,13-diamine) commercially available, for example, from BASF, Ludwigshafen Germany. The polyamidoamine may be branched or unbranched aromatic or branched or unbranched aliphatic. Preferably, the polyamidoamine is an aliphatic polyamidoamine. Polyamidoamines which may be advantageously used in the context of the present disclosure are obtained as described in [0010] to [0029] of EP 249527 A1, the disclosure of which is incorporated herein by reference.

Both part (A) and part (B) of the curable coating composition precursor according to the present disclosure comprise inorganic microspheres. Inorganic microspheres have the effect of yielding improved sandability and, in particular, a reduced density of the compositions. Microspheres have the capability of reducing the density of a composition, i.e. the density of a composition as described including the microspheres is lower than the density of a composition without the microspheres. Preferably, the inorganic microspheres are hollow inorganic microspheres due to an even further reduced density of the resulting compositions. The microspheres are preferably selected glass bubbles or ceramic bubbles. By way of example, microspheres may be selected from a variety of materials including glass, silica, ceramic (including sol-gel derived) or zirconia. The inorganic filler materials may have an average particle size typically of less than 500 μm, or between 10 and 100 μm. Preferred hollow inorganic microspheres include glass microspheres which are commercially available, for example, from 3M Company under the trade designation Glass bubbles D32, MICROBUBBLES or Scotchlite D32/4500.

Preferably, part (A) of the curable coating composition precursors as described herein comprises the inorganic microspheres in an amount of from 5 to 45 wt.-%, preferably from 10 to 40 wt.-%, more preferably from 15 to 35 wt.-%, based on the total weight of part (A). Preferably, part (B) of the curable coating composition precursors as described herein comprises the inorganic microspheres in an amount of from 5 to 45 wt.-%, preferably from 10 to 40 wt.-%, more preferably from 15 to 35 wt.-%, based on the total weight of part (B). Using lower amounts of inorganic microspheres would yield compositions not having the desired sandability and/or not fulfilling the need of lightweight compositions, using higher amounts would furnish compositions not having the desired mechanical properties or the desired resistance of the coatings towards water and weathering effects.

Part (A) and also part (B) of the curable coating composition precursor according to the present disclosure may further comprise at least one inorganic filler material. The inorganic filler material may have at least one advantageous effect such as reduced density of the composition, improved sandability, improved flow and/or workability of the compositions. Inorganic filler materials are preferred over organic filler materials since they do not compromise the compressive strength of the compositions. In general, any inorganic filler material known in the art may be used, i.e. silica fillers, glass, ceramics and the like.

Preferably, the at least one filler material comprises at least one silica compound. Silica compounds may have the effect of giving rise to improved flow, improved workability and increased of the compositions as described herein, without sacrificing mechanical strength or resistance to water and the like of the cured coatings obtained therefrom. In this regard, it is preferred that the at least one silica compound is selected from fused silica, fumed silica, perlite, and any combinations and mixtures thereof. Silica compounds as described herein may preferably be employed in the form of silica particles. Preferably, the silica particles comprise fumed silica, preferably hydrophobically fumed silica, fused silica, amorphous silica particles, hollow silica particles, silica gels, calcium silicates, and any combinations thereof. Exemplary commercial fillers include SHIELDEX AC5 (a synthetic amorphous silica, calcium hydroxide mixture available from W.R. Grace in Columbia, Md., USA); CAB-O-SIL TS 720 (a hydrophobic fumed silica-treated with polydimethyl-siloxane-polymer available from Cabot GmbH in Hanau, Germany); AEROSIL VP-R-2935 (a hydrophobically fumed silica available from Degussa in Düsseldorf, Germany); AEROSIL R-202 (a hydrophobically fumed silica available from Evonik Industries, Germany); glass-beads class IV (250-300 microns): amorphous silica (available from 3M Deutschland GmbH in Neuss, Germany); MINSIL SF 20 (available from Minco Inc., 510 Midway, Tenn., USA); amorphous, fused silica; and APYRAL 24 ESF (epoxysilane-functionalized (2 wt.-%) aluminium trihydrate available from Nabaltec GmbH in Schwandorf, Germany). Fused silica is available, for example, under the trade designation MINSIL from Minco Inc., Midway, USA.

An important requirement for adhesives intended for use in aircrafts or vehicles such as cars or train is to exhibit at least in a certain way flame-retardant properties. There are numerous examples of industry standards and requirements to this respect. In addition, according to further requirements, adhesives and coatings should not or even must not emit smoke and/or toxic fumes when being heated above certain temperatures or when being burned. Moreover, adhesive and coating compositions should also be REACH compliant. Accordingly, the curable coating composition precursor according to the present disclosure comprises at least one flame retardant compound in part (A) and/or part (B). However, a coating also has to provide certain handling properties such as a certain viscosity and additionally provide mechanical stability after being cured, even at elevated or low temperatures. Due to the wise selection of components, in particular when used in the preferred amounts, the coating compositions and the cured coatings obtained therefrom achieve these desirable properties.

In this regard, the at least one flame retardant compound is selected from red phosphorous-based compounds, organophosphorous compounds and halogenated organic compounds, and any combinations and mixtures thereof. Preferably, the red phosphorous-based compound comprises a red phosphorous powder, optionally in the form of a blend of a stabilised micro-encapsulated red phosphorous in an epoxy resin carrier. With regard to a combination of desirable flame-retardant, handling and mechanical properties, the use of organophosphorous compounds is preferred. Preferably, the organophosphorous compound is selected from organophosphates, (preferably triphenyl phosphate, resorcinol bis(diphenylphosphate), bisphenol A diphenylphosphate, tricresyl phosphate), organophosphonates (preferably dimethyl(methylphosphonate), and phosphinates (preferably metal phosphinates, preferably metal selected from aluminium, iron, kalium, calcium, sodium, preferably phosphinates selected from diethyl phosphinate, dimethylphosphinate, dipropylphosphinate, dibutylphosphinate, diphenylphosphinate), (preferably aluminium diethylphosphinate). An example for a commercially available organic phosphinate which can be advantageously used within the present disclosure is Exolite OP 1230.

With regard to the halogenated organic compound, it is preferably selected from organochlorines and organobromines, preferably from organobromines. The organobromine is preferably selected from brominated polystyrenes, brominated carbonate oligomers (BCO), brominated epoxy oligomers (BEO), tetrabromopthalic anhydride, tetrabromobisphenol A (TBBA), hexabromocyclododecane (HBCD), their derivatives and any combinations thereof.

It is preferred that the at least one fire retardant compound is contained in part (A) of the compositions as described herein in an amount of from 1 to 40 wt.-%, preferably from 3 to 35 wt.-%, more preferably from 5 to 30 wt.-%, based on the total weight of part (A). Similarly, it is preferred that the at least one fire retardant compound is contained in part (B) in an amount of from 1 to 40 wt.-%, preferably from 3 to 35 wt.-%, more preferably from 5 to 30 wt.-%, based on the total weight of part (B). Within these ranges, the desirable combination of fire retardant and mechanical properties of the compositions and coatings according to the present disclosure is most pronounced.

The second part (B) of the curable coating compositions according to the present disclosure comprises at least one epoxy resin. Suitable epoxy resins for use herein will be easily identified by those skilled in the art, in the light of the present description.

The epoxy resin for use herein is not particularly limited. Epoxy resins are polymers having one or more epoxyfunctionality. Typically but not exclusively, the polymers contain repeating units derived from monomers having an epoxy-functionality but epoxy resins can also include, for example, silicone-based polymers that contain epoxy groups or organic polymer particles coated with or modified with epoxy groups or particles coated with, dispersed in, or modified with epoxy-groups-containing polymers. The epoxy-functionalities allow the resin to undertake cross-linking reactions. The epoxy resins may have an average epoxy-functionality of at least 1, greater than one, or of at least 2.

Any epoxy resins well known to those skilled in the art may be used in the context of the present disclosure. Epoxy resins may be aromatic, aliphatic, cycloaliphatic or mixtures thereof. In a typical aspect, the epoxy resins for use herein are aromatic. Preferably, the epoxy resins contain moieties of the glycidyl or polyglycidyl ether type. Such moieties may be obtained, for example, by the reaction of a hydroxyl functionality (for example but not limited to dihydric or polyhydric phenols or aliphatic alcohols including polyols) with an epichlorohydrin-functionality. As referred to herein, dihydric phenols are phenols containing at least two hydroxy groups bonded to the aromatic ring (also referred to as "aromatic" hydroxy groups) of a phenol—or in case of polyphenols at least two hydroxy groups are bonded to an aromatic ring. This means the hydroxyl groups can be bonded to the same ring of the polyphenol or to different rings each of the polyphenol. Therefore, the term "dihydric phenols" is not limited to phenols or polyphenols containing two "aromatic" hydroxy groups but also encompasses polyhydric phenols, i.e. compounds having more than two "aromatic" hydroxy groups.

Examples of useful dihydric phenols include resorcinol, catechol, hydroquinone, and polyphenols including p,p'-dihydroxydibenzyl, p,p'-dihydroxyphenylsulfone, p,p'-dihydroxybenzophenone, 2,2'-dihydroxyphenyl sulfone, p,p'-dihydroxybenzophenone, 2,2-dihydroxy-1,1-dinaphthylmethane, and the 2,2', 2,3', 2,4', 3,3', 3,4', and 4,4' isomers of dihydroxydiphenylmethane, dihydroxydiphenyldimethylmethane, dihydroxydiphenylethyl methylmethane, dihydroxydiphenylmethylpropylmethane, dihydroxydiphenylethylphenylmethane, dihydroxydiphenylpropylenphenylmethane, dihydroxydiphenylbutylphenylmethane, dihydroxydiphenyltolylethane, dihydroxydiphenyltolylmethylmethane, dihydroxydiphenyldicyclohexylmethane, and dihydroxydiphenylcyclohexane.

Preferred epoxy resins include epoxy resins containing or consisting of glycidyl ethers or polyglycidyl ethers of dihydric or polyhydric phenols, such as for example, but not limited to bisphenol A, bisphenol F and combinations thereof. They contain one or more repeating units derived from bisphenol A and/or F. Such ethers, or such repeating units are obtainable, for example, by a polymerization of glycidyl ethers of bisphenol A and/or F with epichlorohydrin. Epoxy resins of the type of diglycidyl ether of bisphenol A can be represented by the formula wherein n denotes the repeating unit (in case of n=0 the formula below represents the diglycidyl ether of bisphenol A):

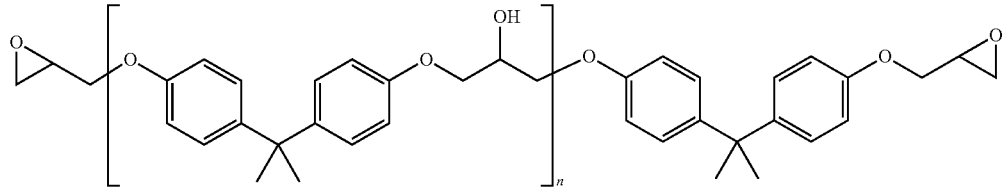

Typically, the epoxy resins are blends of several resins. Accordingly, n in the formula above may represent an average value of the blend, and may not be an integer but may include values like, for example and not limited thereto, 0.1 to 2.5. Preferably, the at least one epoxy resin comprises a bisphenol A based epoxy resin and/or a bisphenol F based epoxy resin, preferably a blend comprising at least one bisphenol A based epoxy resin and at least one bisphenol F based epoxy resin.

Instead of, or in addition to, using the aromatic epoxy resins described above also their fully or partially hydrogenated derivatives (i.e. the corresponding cycloaliphatic compounds) may be used. Instead of, or in addition to using aromatic epoxy resins also aliphatic, for example acyclic, linear or branched, epoxy resins may be used.

Typically, the epoxy resin is liquid. The epoxy resins may include solid epoxy resins, used in dissolved form, or dispersed, for example in another liquid resin. Preferably, the epoxy resin is liquid at ambient conditions (23° C., 1 bar). The epoxy resins may contain halogens, preferably bromine atoms to make them less flammable.

Examples of suitable and commercially available epoxy resins include diglycidylether of bisphenol A (available under the trade designation EPON 828, EPON 830, EPON 1001 or EPIKOTE 828 from Hexion Speciality Chemicals GmbH, Rosbach, Germany, or under the trade designation D.E.R-331 or D.E.R-332 from Dow Chemical Co.); diglycidyl ether of bisphenol F (e.g. EPICLON 830 available from Dainippon Ink and Chemicals, Inc. or D.E.R.-354 from Dow Chemical Co, Schwalbach/Ts., Germany); diglycidyl ethers of a blend of bisphenol A and bisphenol F (e.g. EPIKOTE 232 available from Momentive Speciality Chemicals, Columbus, USA). Other epoxy resins based on bisphenols are commercially available under the trade designations EPILOX (Leuna Epilox GmbH, Leuna, Germany); flame retardant epoxy resins are available under the trade designation D.E.R 580 (a brominated bisphenol type epoxy resin available from Dow Chemical Co.). Cycloaliphatic epoxy resins are commercially available under the trade designation EPINOX (Hexion Specialty Chemicals GmbH).

Preferably, part (B) of the compositions as described herein comprise the at least one epoxy resin in an amount in the range of from 15 to 70 wt.-%, preferably from 20 to 65 wt.-%, more preferably from 25 to 60 wt-%, even more preferably from 30 to 55 wt-%, based on the total weight of part (B).

It is further preferred that part (B) of the curable adhesive precursor according to the present disclosure comprises a reactive diluent. Reactive diluents as used herein are generally epoxy-based reactive diluents, i.e. they are epoxy-containing molecules. Thus, the terms "epoxy-based reactive diluent" and "reactive diluent" may be used interchangeably. The epoxy-based reactive diluent for use herein is not particularly limited. Any epoxy-based reactive diluent commonly known in the art may be used in the context of the present disclosure.

Without wishing to be bound by theory, it is believed that the epoxy-based reactive diluent beneficially impacts, in particular, the flow characteristics of the curable compositions as described herein.

In a particular aspect of the present disclosure, wherein the epoxy-based reactive diluent for use herein has a saturated or unsaturated cyclic backbone, and preferably comprises glycidyl ether as reactive terminal end portions.

According to a preferred aspect, the epoxy-based reactive diluent for use herein is selected from the group consisting of diglycidyl ether of resorcinol, diglycidyl ether of cyclohexane dimethanol, diglycidyl ether of neopentyl glycol, triglycidyl ether of trimethylolpropane, and any mixtures thereof.

Commercially available reactive diluents for use herein include for example "Reactive Diluent 107" (available from Hexion) and the "Epodil" series (available from Air Products and Chemical Inc., Allentown, Pa., USA) including in particular EPODIL 746, EPODIL 747, EPODIL 748 and EPODIL 757.

It is preferred that part (B) of the compositions as described herein comprises the at least one reactive diluent in an amount of from 1 to 25 wt.-%, preferably from 2 to 20 wt.-%, more preferably from 5 to 15 wt.-%, based on the total weight of part (B).

Part (B) of the compositions according to the present disclosure further comprises at least one epoxy reactive flexibilizer. An epoxy reactive flexibilizer is a compound having at least one epoxy moiety and also at least one long alkyl or alkenyl component. The presence of the at least one epoxy reactive flexibilizer has the effect of improved flexibility of the curable composition and the cured coatings obtained therefrom even at low temperatures and an increased hydrophobicity of the cured coating. While the first property may be desirable from a handling point of view, both properties are advantageous with regard to corrosion protection of a substrate surface onto which the compositions as described herein are coated. This is in particular advantageous when the compositions according to the present disclosure are applied onto a steel surface. In this case, an improved corrosion protection may be expected.

The epoxy reactive flexibilizer is preferably a component comprising an aromatic core such as phenyl having at least one long aliphatic side chain and at least one side chain comprising at least one epoxy moiety. Such compounds are obtainable from epoxidizing phenolic lipids. Generally, the term "phenolic lipids" is used for a class of natural products composed of long aliphatic chains and phenolic rings. As used herein, this term describes compounds of either natural or preferably synthetic origin composed of long aliphatic chains and phenolic rings. Preferably, the at least one phenolic lipid is selected from alkylcatechols, alkylphenols, alkylresorcinols and anacardic acids. More preferably, the at least one phenolic lipid is an alkylphenol selected from propylphenol, butylphenol, amylphenol, octylphenol, nonylphenol, dodecylphenol and cardanol-based compounds. Epoxy-reactive Cardanol-based compounds are commercially available, e.g. under the trade designation NX-2026 or Ultra Lite 2023 from Cardolite Corporation.

It is preferred that part (B) of the compositions as described herein comprise the at least one epoxy-reactive flexibilizer in an amount of from 1 to 25 wt.-%, preferably from 2 to 20 wt.-%, more preferably from 5 to 15 wt.-%, based on the total amount of part (B).

Preferably, the curable coating composition precursor according to the present disclosure comprises
(a) a first part (A) comprising:
(i) at least one amine epoxy curing agent based on an phenolic lipid in an amount of from 15 to 80 wt.-%, preferably from 25 to 75 wt.-%, more preferably from 30 to 70 wt.-%, based on the total weight of part (A);
(ii) inorganic microspheres in an amount of from 5 to 45 wt.-%, preferably from 10 to 40 wt.-%, more preferably from 15 to 35 wt.-%, based on the total weight of part (A);
(iii) at least one fire retardant compound in an amount of from 1 to 40 wt.-%, preferably from 3 to 35 wt.-%, more preferably from 5 to 30 wt.-%, based on the total weight of part (A);
(iv) at least one at least one second amine epoxy curing agent in an amount of from 10 to 60 wt.-%, preferably from 15 to 55 wt.-%, more preferably from 20 to 50 wt.-%, based on the total weight of part (A);
(b) a second part (B) comprising:
(i) at least one epoxy resin in an amount of from 15 to 70 wt.-%, preferably from 20 to 65 wt.-%, more preferably from 25 to 60 wt.-%, even more preferably from 30 to 55 wt.-%, based on the total weight of part (B);
(ii) at least one reactive diluent in an amount of from 1 to 25 wt.-%, preferably from 2 to 20 wt.-%, more preferably from 5 to 15 wt.-%, based on the total weight of part (B);

(iii) at least one epoxy reactive flexibilizer in an amount of from 1 to 25 wt.-%, preferably from 2 to 20 wt.-%, more preferably from 5 to 15 wt.-%, based on the total weight of part (B);

(iv) inorganic microspheres in an amount of from 5 to 45 wt.-%, preferably from 10 to 40 wt.-%, more preferably from 15 to 35 wt.-%, based on the total weight of part (B);

(v) at least one fire retardant compound in an amount of from 1 to 40 wt.-%, preferably from 3 to 35 wt.-%, more preferably from 5 to 30 wt.-%, based on the total weight of part (B).

It is preferred that part (A) and part (B) are present in the compositions as described herein, in particular in the curable coating composition precursor, in a ratio of 10:1 to 1:5 (part (B):part (A)), preferably from 5:1 to 1:2, more preferably from 3:1 to 1:1. For example, the ratio of part (B) to part (A) may be about 2:1 by volume. This may be achieved by containing part (A) and part (B) in an applicator well-known in the art comprising two separate cartouches (i.e. part (A) in one cartouche and part (B) in the other cartouche) and a mixing nozzle. It is also understood that the advantageous effects of the compositions according to the present disclosure are only achieved within these mixing ratios. For example, using a lower amount of part (A) may compromise both curing speed of the curable coating composition as well as the resistance of the coating obtained therefrom.

The present disclosure further provides a curable coating composition, obtained from combining parts (A) and (B) of the curable coating composition precursor as described herein. Combining as used herein has the meaning commonly used in the art for two-component compositions, i.e. combining both parts and mixing afterwards or mixing and combining in one step. This is often the case in mixing nozzles well-known in the art and commercially used and available for this purpose. The curable coating composition is preferably prepared directly before its intended use, i.e. the application onto a surface of a substrate. After application and subsequent curing of the coating composition according to the present disclosure, a sandable coating is obtained, which further protects the surface against influences such as water which would otherwise have a negative impact to the surface, e.g. the triggering of corrosion. The curable coating composition obtained from parts (A) and (B) of the curable coating composition precursor as described herein has a density of less than 0.7 g/cm$^3$. This has the effect that the coating derived therefrom is lightweight enough for aerospace applications from a weightsaving point of view, without sacrificing any mechanical strength or resistance to water or weathering stresses. Preferably, the coating composition has a density of less than 0.65 g/cm$^3$, more preferably of less than 0.6 g/cm$^3$.

The present disclosure further provides a method of smoothening surfaces comprising the following steps:

(a) Providing a curable coating composition precursor as described herein, (b) Combining parts (A) and (B) of the curable coating composition precursor so as to form a curable coating composition;

(c) Applying the curable coating composition to at least part of the surface a substrate;

(d) Allowing the curable coating composition to cure so as to obtain a cured coating;

(e) Sanding the surface comprising the cured coating, thereby obtaining a smoothed surface.

As described above, parts (A) and (B) are combined so as to form a curable coating composition, preferably by means of a mixing nozzle from which the curable coating composition is directly applied onto at least part of the surface of at least one substrate. Application of the curable coating composition may be carried out by means commonly known and used in the art, e.g. direct manual application from the mixing nozzle (and optional further manual spreading by a spatula and the like). Due to the properties of the excellent extrudability and the curing characteristics of the curable coating compositions according to the present disclosure, the coating compositions are well suited for automatic application such as application via coating knife or doctor blade and the like. Thus, the coating compositions as described herein are well suited for maintenance and manufacture operations in aerospace and automotive industries. Accordingly, it is preferred that application of the curable coating composition in step (c) is carried out by automatic means, preferably selected from doctor blade, extrusion, dispensing, coating knife or mixing nozzle. Coating onto the substrate as described herein comprises coating onto a substrate until a desired thickness, but also comprises filling up cracks, holes and other kind of damages in the surface of the substrate. Accordingly, a more or less even surface coating may be obtained. Accordingly, it is preferred that the surface of the substrate comprises defects and/or gaps, which are filled and/or covered by the coating composition of the present disclosure. This is particular useful when repairing damaged parts or filling gaps in or between parts.

Due to the properties of the compositions as described herein, the substrate comprises materials selected from aluminium and its alloys, steel, carbon, ceramics, and fiber-enforced composite materials, preferably carbon fiber-enforced composite materials. Generally, these materials may be coated with the compositions according to the present disclosure. With respect to the advantageous properties of the coating compositions and their excellent suitability for applications in aerospace, carbon fiber-enforced composite materials are preferred. Furthermore, it is preferred that the surface of the substrate comprises defects such as cracks and/or gaps, which are filled and/or covered by the compositions according to the present disclosure. The substrate is preferably a part an aircraft, car, truck, train or boat, preferably a part of an aircraft. More specifically, it is preferred that the part of an aircraft comprises at least one part of a rotation engine, part of a body part, part of a wing, part of a flap, and/or part of a panel or assembly of panels. During manufacture or maintenance, the curable coating composition according to the present disclosure may be advantageously applied to at least part of the surface of these parts, preferably by automatic means (i.e. respective machinery or devices). Preferably, the rotation engine is a turbine as present in most cases in modern aircraft, i.e. the turbine is preferably an aircraft engine. In this regard, turbines, in particular when used as aircraft engines, are in most cases provided with large air intakes. This in in particular true with turbofan engines as used in most aircraft travelling at subsonic speeds. Turbofan engines are used since they are optimized for providing propulsion at these speeds and below, i.e. they offer a combination of thrust, fuel economy and (important especially for landing and starting moves in densely populated areas) relatively silent operation. Hence, it is preferred that the aircraft engine is a turbofan engine. Air-exposed parts of these turbofan engines have desirably a smooth surface. This will have the effect of an improved airflow, i.e. improved aerodynamics, which may lead to better output of the turbofan engine and/or better fuel economy. In particular, it is desirable that the gap between the fan casing and the tips of the turbofan blades is as small and as smooth as possible. This may be achieved by the curable compositions and the method according to the present disclosure. In this case, the coating composition as described herein is applied to the air-exposed part of the fan case, i.e. to the inside part of the fan casing. Applying the coating composition is preferably carried out by automatic means. It is also preferred that the fan case of the turbofan engine comprises a fiber-enforced composite material, preferably a carbon fiber-enforced composite material.

Next, in step (d), the curable coating composition is allowed to cure. That is, the curable coating composition is preferably allowed to cure at ambient temperatures, without the need of externally heating the coating up, such as putting the coated substrate into a hot air oven. Preferably, curing in step (d) takes place at temperatures in the range of from 5 to 40° C., preferably from 10 to 35° C., more preferably from 15 to 30° C. The ability to cure at ambient temperatures without the need of extra heating is a particular advantage of the coating compositions as described herein, in particular in conjunction with the industrial manufacture of larger parts in aerospace or automotive industries. That is, it is possible to use the coating composition according to the present disclosure or to carry out the method as described herein for large or very large parts, and/or without the need to disassemble a combination of parts. For example, there is no need to remove a part from an aircraft for carrying out the method. This represents a further advantage of the coating compositions and the method as described herein.

After allowing the curable coating composition to cure, a sandable surface is obtained. This surface is then sanded so as to obtain a smoothed surface which then may be further treated, e.g. by painting. Sanding may be carried out by manual or automated means, preferably by automated means as known in the art. Also, a combination of manual and automated means may be used, e.g. sanding the already pre-sanded surface manually in order to achieve a well-smoothed surface. In a preferred embodiment, i.e. when the substrate is the inside of the fan case of a turbofan engine, it is preferred that sanding and/or smoothing is carried out by the tips of the fan blades itself. That is, the coating composition is applied to the inside of the fan case of the turbofan engine and allowed to cure. After curing, turning the turbofan engine will cause the tips of the fan blades to sand the coating, thereby creating both a smoothed surface of the inner fan case and, in particular, creating a very small gap between the fan case and the tips of the fan blades. Creating the smallest possible gap between the fan case and the tips of the fan blades is very desirable with regard to the airflow and the efficiency of the turbofan aircraft engine. This may be achieved by the coating composition and the method according to the present disclosure. Accordingly, it is preferred that the method as described herein is a method for smoothening surfaces of parts of vehicles of in aerospace, automotive and transportation industries, preferably a method for smoothening surfaces of aircrafts.

The present disclosure further provides a use of the coating composition precursors and curable coating compositions as described herein for manufacture and maintenance operations in aerospace, automotive and transportation industries, preferably in aerospace industries. Preferably, the use comprises maintenance and manufacture operations of rotation engines in aerospace industries. Further preferred is a use of the coating composition precursor and coating compositions as described herein for smoothening of air-exposed surfaces of rotation engines, preferably turbofan engines. Preferably, the surface is the inside of the turbofan casing. Also preferred is the use as described herein for narrowing the gap between the tips of the turbofan blades and the inner surface of the fan casing of turbofan engines, in particular in aerospace industries. That is, a preferred use is the use as abradable turbofan case filler in aerospace industries.

EXAMPLES

The present disclosure is further described without however wanting to limit the disclosure thereto. The following examples are provided to illustrate certain embodiments but are not meant to be limited in any way. Prior to that some test methods used to characterize materials and their properties will be described. All parts and percentages are by weight unless otherwise indicated.

EXAMPLES

Materials Used:

| Trade name | Function | Supplier |
| --- | --- | --- |
| Epikote 828 | Base resin | Resolution performance products |
| Epikote 232 | Base resin | Resolution performance products |
| Disparlon 6500 | Thixotropic agent | King Industries |
| Epodil 757 | Reactive diluent | Air Products |
| Dynasylan Glyeo | Viscosity modifier | Evonik |
| BYK W9010 | Wetting agent | BYK Chemie |
| Cardolite Ultralite 513 | Flexiblizer | Cardolite |
| Disflamoll DPK | Flame retardant | LANXESS |
| Exolit RP 6500 | Flame retardant | Clariant |
| Saytex BT93 | Flame retardant | Albemarle |
| Exolit OP 930 | Flame retardant | Clariant |
| Expandable Graphite | Flame retardant | Graphit Kropfmühl GmbH |
| MC273 | Curing agent | 3M |
| Cardolite NX 5607 | Curing agent | Cardolite |
| Cardolite LITE 3060 | Curing agent | Cardolite |
| Cardolite NX 5608 | Curing agent | Cardolite |
| TTD | Curing agent | BASF |
| Ancamine K54 | Cure accelerator | Air Products |
| Glass bubbles | Weight reduction | 3M |
| Aerosil R202 | Thixotropic agent | Degussa |

Test Methods

Density

Density of the cured epoxy-based compositions was measured according to DIN 53479A. Samples of the epoxy-based composition were prepared by casting the corresponding precursors into moulds and cured at ambient temperature for at least 48 h. The cured samples of the epoxy-based composition were removed from the moulds and their exact dimensions recorded. Each sample was weighed and the density calculated and recorded in grams per $cm^3$.

Extrusion Rate

A 400 ml Cartridge (Mixpac, Switzerland) was filled manually to 400 ml with parts B and parts A in a ratio of 2:1 by volume. A mixing nozzle of type MC 13-18 (static 2K mixer from Sulzer, Switzerland) was fitted to the cartridge. The mixing nozzle had a circular outlet nozzle having a diameter of 4 mm. The product was extruded from the cartridge by using a pneumatic dispensing gun. The extrusion rate was determined by measuring the quantity extruded applying a pressure of 4 bar for 60 seconds. Measurements were made at room temperature. Each composition was tested 3 times and the results were expressed in g/min and represent the average from the three measurements.

Overlap Shear Strength

Overlap shear strength was determined according to DIN EN 2243-1 (2005) using a tensile tester at a crosshead speed of 10 mm/min. The test-results were reported in MPa. The overlap shear strength was measured on carbon fiber reinforced epoxy composite (CFRP).

Equipment: Zwick/Roell Z050 tensile-tester with thermal chamber (Zwick GmbH & Co. KG, Ulm, Germany)

Vertical Burn Test

The vertical burn test was performed according to Airbus Directive ABD 0031, Issue September 2002. Three test specimens with a dimension of 3 mm×75 mm×300 mm were cut off a 3 mm×400 mm×400 mm panel of epoxy composition. The epoxy composition was extruded from a dual pack cartridges into aluminum mold and allowed to cure for at least 48 h at 23 (+2) ° C. The specimens were then tested in a flammability chamber to the 60-second vertical Bunsen burner test. After an exposure to the flame, self-extinguishing times were measured and the results averaged for each of the three epoxy-based resin test specimens.

Thermal Cycling Tests:

The material was extruded form the cartridge directly on composite panels. The material was then spread on the surface of the panel like a coating layer having a thickness between 2-3 mm. The composition was then cured at ambient temperature. After curing the coated composite panels was placed in environmental chamber and subjected to following cycle:

112 h at 44° C. & 95% relative humidity followed by 56 h at 150° C.

After 8 cycles the panel was visually inspected for cracks or delamination.

Shore D Hardness:

Cured sheets of the composition having thickness of 3 mm were fabricated. The Shore D hardness of each composition was determined according to ISO 868. 3 Individual measurements were recorded and the result averaged.

Preparation of Part (A) and Part (B)

The ingredients as set forth in tables 1 and 2 were used to prepare part (A) and part (B) according to the procedures set forth below.

TABLE 1

Composition of part (B)

| Part B: Base Resin | Weight % |
| --- | --- |
| Epoxy resin (Epilox 1850) | 45 |
| Poly amide Wax | 0.5 |
| BYK W 9010 | 0.5 |
| Epodil 757 | 9 |
| Cardolite NC 513 (1) | 9 |
| Saytex BT93 | 3 |
| Exolit OP 930 | 12 |
| Glass bubbles | 21 |
| Total | 100 |

TABLE 2

Composition of part (A)

| Part A (Hardener) | Ex. 1 | F2 | F4 | Ex. 2 |
| --- | --- | --- | --- | --- |
| NX5608 (2) | 60 | 0 | 0 | 0 |
| MC 273 | 0 | 60 | 30 | 30 |
| TTD Adduct | 0 | 0 | 30 | 0 |
| NX 5607 (2) | 0 | 0 | 0 | 30 |
| Ancamine K54 | 7 | 7 | 7 | 7 |
| Cresyl diphenyl phosphate | 10 | 10 | 10 | 10 |
| Aerosil R202 | 1 | 1 | 1 | 1 |
| Glass bubbles | 22 | 22 | 22 | 22 |
| Total | 100 | 100 | 100 | 100 |

Part B:

In 150 ml Speed mixer cup the epoxy resin Epon 828 and Paraloid 2650J (Core shell rubber) were weighed and mixed for 1 min at 3500 rpm. The mixture was then placed in air-driven Oven at 100° C. for about 60 min and then again mixed for 1 min to ensure complete dispersion of the core shell particles in the epoxy resin. In next step Epalloy 7200, Epodil 757, Eponex 1510 and Cardolite NC 513 ultra-light were added to the above mixer and mixed for 1 min. After that Minsil SF 20, Eurocell 140, Aerosil 8202 were added and mixed until homogeneous mixture was obtained. Then glass bubbles were added and mixed for further 1 min. The complete mixture was degassed under mixing in thinky speed mixer. The degassed part B was then filled into one side of a 200 ml dual pack cartridge having a mix ratio of 2 to 1 by volume. That is, the mixing ration part (B):part (A) was 2:1 by volume.

Part A:

In 150 ml Speed mixer cup the calcium nitrates were dissolved in the amine. This was achieved by mixing them together and heat the mixture to about 60° C. in oven. Following that the fillers were (Eurocell, Minsil, Aerosil, Glass bubbles) added stepwise until a homogeneous mixture was obtained. The complete mixture was then degassed under mixing and filled in the smaller compartment of the 200 ml Cartridge.

TABLE 3

Test result summary

| | Ex. 1 | F2 | F4 | Ex. 2 |
| --- | --- | --- | --- | --- |
| Cured Density (g/ml) | 0.5 | 0.54 | 0.52 | 0.5 |
| Extrudability (g/min) | 30 | 34 | 33 | 30 |
| Shear Strength on composites (Mpa) | 9 | 10 | 10.5 | 10 |
| 60 Vertical burn test | Pass | Pass | Pass | Pass |
| Shore D Hardness/abradability | 60 | 58 | 57 | 61 |
| 7 days - Water absorption | 1.5% | 12% | 15% | 2% |
| % Change in Hardness after water immersion | No significant change | 27% | 30% | No significant change |
| Thermal Cycling (8 Cycle) | Pass | Fail | Fail | Pass |

The invention claimed is:

1. A curable coating composition precursor, comprising
(a) a first part (A) comprising:
(i) at least one first amine epoxy curing agent based on an phenolic lipid;
(ii) inorganic microspheres; and
(iii) a second amine epoxy curing agent chosen from polymeric amines, polymeric diamines, polymeric polyamines and epoxy-amine adducts, in an amount from 20 to 50 wt.-%, based on the total weight of part (A), (b) a second part (B) comprising:
 (i) at least one epoxy resin;
 (ii) optionally, at least one reactive diluent;
 (iii) at least one epoxy reactive flexibilizer;
 (iv) inorganic microspheres;
wherein
the curable coating composition precursor comprises at least one fire retardant compound in part (A) and/or part (B); and
the curable coating composition obtained by combining part (A) and part (B) has density less than 0.7 g/cm$^3$, and
the combined amounts of the at least one first and the at least one second amine epoxy curing agents are in the range of from 30 to 70 wt.-%, based on the total weight of part (A).

2. The curable coating composition precursor according to claim 1, wherein the at least one epoxy resin comprises a bisphenol A based epoxy resin and/or a bisphenol F based epoxy resin.

3. The curable coating composition precursor according to claim 1, wherein phenolic lipid of the at least one amine epoxy curing agent based on a phenolic lipid is selected from alkylcatechols, alkylphenols, alkylresorcinols and anacardic acids.

4. The curable coating composition precursor according to claim 1, wherein the phenolic lipid of the at least one amine epoxy curing agent based on a phenolic lipid is an alkylphenol selected from propylphenol, butylphenol, amylphenol, octylphenol, nonylphenol, dodecylphenol and cardanol-based compounds.

5. The curable coating composition precursor according to claim 1, wherein the at least one amine epoxy curing agent based on a phenolic lipid is a phenalkamine.

6. The curable coating composition precursor according to claim 1, wherein the at least one fire retardant compound is selected from red phosphorous-based compounds, organophosphorous compounds and halogenated organic compounds, and any combinations and mixtures thereof.

7. The curable coating composition precursor according to claim 6, wherein the organophosphorous compound is selected from organophosphates.

8. The coating composition precursor according to claim 1, wherein the epoxy reactive flexibilizer comprises an aromatic core having at least one aliphatic side chain, and at least one epoxy moiety.

9. The coating composition precursor according to claim 8, wherein the epoxy reactive flexibilizer is based on a phenolic lipid.

10. A method of smoothening surfaces comprising the following steps:
 (a) providing a curable coating composition precursor according to claim 1,
 (b) combining parts (A) and (B) of the curable coating composition precursor so as to form a curable coating composition;
 (c) applying the curable coating composition to at least part of the surface a substrate;
 (d) allowing the curable coating composition to cure so as to obtain a cured coating;
 (e) sanding the surface comprising the cured coating, thereby obtaining a smoothed surface.

11. The method according to claim 10, wherein curing in step (d) takes place at ambient temperature.

12. The method according to claim 10, wherein the method is a method for smoothening surfaces of parts of vehicles in aerospace, automotive, or transportation industries.

13. The method according to claim 10, wherein the substrate comprises a part of an aircraft.

14. The method according to claim 10, wherein the surface comprises materials selected from aluminium and its alloys, steel, carbon, ceramics, and fiber-enforced composite materials.

15. A method of using the curable coating composition precursor according to claim 1 for manufacture and maintenance operations of rotation engines.

16. The method according to claim 15, wherein the rotation engines are jet engines.

* * * * *